United States Patent
Liu

(10) Patent No.: US 11,106,317 B1
(45) Date of Patent: Aug. 31, 2021

(54) COMMON MODE NOISE SUPPRESSION WITH RESTORATION OF COMMON MODE SIGNAL

(71) Applicant: Synaptics Incorporated, San Jose, CA (US)

(72) Inventor: Chunbo Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/847,886

(22) Filed: Apr. 14, 2020

(51) Int. Cl.
*G06F 3/044* (2006.01)

(52) U.S. Cl.
CPC .................... *G06F 3/044* (2013.01)

(58) Field of Classification Search
CPC ....................................... G06F 3/044
See application file for complete search history.

(56) References Cited

U.S. PATENT DOCUMENTS

| | | | | |
|---|---|---|---|---|
| 7,868,874 | B2 * | 1/2011 | Reynolds ................ | G06F 3/044 345/173 |
| 8,258,797 | B2 * | 9/2012 | Shahparnia ............. | G01D 3/08 324/659 |
| 8,686,735 | B2 * | 4/2014 | Weinerth .............. | G06F 3/0416 324/519 |
| 9,218,095 | B2 * | 12/2015 | Hargreaves ........... | G06F 3/0446 |
| 9,268,441 | B2 * | 2/2016 | Walsh ................. | G06F 3/04166 |
| 9,753,577 | B2 * | 9/2017 | Peterson .............. | G06F 3/0447 |
| 9,946,404 | B1 * | 4/2018 | Berget ................ | G06F 3/04182 |
| 2007/0052456 | A1 * | 3/2007 | Watson ................ | H03L 7/06 327/113 |
| 2010/0327882 | A1 * | 12/2010 | Shahparnia ........... | G01D 5/24 324/659 |
| 2012/0212241 | A1 * | 8/2012 | Wallace .............. | A63F 3/00643 324/686 |
| 2013/0063395 | A1 * | 3/2013 | Byun .................. | G06F 3/0443 345/174 |
| 2015/0363585 | A1 * | 12/2015 | Gooding ............. | G06K 9/00026 726/19 |
| 2016/0092026 | A1 * | 3/2016 | Stevenson ........... | G06F 3/0445 345/174 |
| 2016/0196803 | A1 * | 7/2016 | Reynolds ............ | G09G 3/20 345/174 |

(Continued)

*Primary Examiner* — Amy Onyekaba
(74) *Attorney, Agent, or Firm* — Ferguson Braswell Fraser Kubasta PC

(57) ABSTRACT

A processing system is disclosed. The processing system includes an amplifier configured to generate a feedback signal, including a spatial common mode estimate generated from spatial-common-mode-processed signals. The processing system further includes charge integrators configured to obtain resulting signals from capacitive sensor electrodes, the resulting signals including a spatial common mode. The charge integrators generate the spatial-common-mode-processed signals by mitigating the spatial common mode in the resulting signals using the feedback signal. The processing system also includes a controller configured to obtain digital touch signals by analog-to-digital converting the spatial-common-mode-processed signals, obtain a digital spatial common mode estimate by analog-to-digital converting the spatial common mode estimate, and obtain at least one digital resulting signal by combining at least one of the digital touch signals with the digital spatial common mode estimate.

17 Claims, 4 Drawing Sheets

(56) References Cited

U.S. PATENT DOCUMENTS

| | | | |
|---|---|---|---|
| 2016/0334902 A1* | 11/2016 | Li | G06F 3/016 |
| 2016/0352353 A1* | 12/2016 | Hargreaves | G06F 3/04166 |
| 2017/0003779 A1* | 1/2017 | Reynolds | G06F 3/04166 |
| 2017/0083161 A1* | 3/2017 | Jain | G06F 3/0446 |
| 2017/0134022 A1* | 5/2017 | Kim | G06F 3/0418 |
| 2017/0212599 A1* | 7/2017 | Sharma | G06F 3/0446 |
| 2017/0212619 A1* | 7/2017 | Sharma | G06F 3/0446 |
| 2017/0285773 A1* | 10/2017 | Ayzenberg | G06F 3/0442 |
| 2018/0004317 A1* | 1/2018 | Bohannon | G06F 3/0418 |
| 2018/0329573 A1* | 11/2018 | Liu | G06F 3/0446 |
| 2018/0341347 A1* | 11/2018 | Yousefpor | G06F 3/043 |
| 2018/0341363 A1* | 11/2018 | Wang | G06F 3/0447 |
| 2019/0149163 A1* | 5/2019 | Bohannon | H03M 3/494 |
| | | | 345/174 |
| 2019/0310739 A1* | 10/2019 | Liu | G06F 3/04182 |

\* cited by examiner

COMMON MODE NOISE SUPPRESSION WITH RESTORATION OF COMMON MODE SIGNAL

TECHNICAL FIELD

The described embodiments relate generally to electronic devices, and more specifically, to suppressing noise (e.g., display noise) associated with touch sensor electrodes.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

SUMMARY

In general, in one aspect, one or more embodiments relate to a processing system. The processing system includes an amplifier configured to generate a feedback signal including a spatial common mode estimate from multiple spatial-common-mode-processed signals. The processing system further includes multiple charge integrators configured to obtain multiple resulting signals from multiple capacitive sensor electrodes, the resulting signals including a spatial common mode, and generate the spatial-common-mode-processed signals by mitigating the spatial common mode in the resulting signals using the feedback signal. The processing system further includes a controller configured to obtain multiple digital touch signals by analog-to-digital converting the spatial-common-mode-processed signals, obtain a digital spatial common mode estimate by analog-to-digital converting the spatial common mode estimate and obtain at least one digital resulting signal by combining at least one of the digital touch signals with the digital spatial common mode estimate.

In general, in one aspect, one or more embodiments relate to a method. The method includes generating, by an amplifier, a feedback signal including a spatial common mode estimate from multiple spatial-common-mode-processed signals, obtaining multiple resulting signals from multiple capacitive sensor electrodes, the resulting signals including a spatial common mode, generating the spatial-common-mode-processed signals by mitigating the spatial common mode in the resulting signals using the feedback signal, obtaining multiple digital touch signals by analog-to-digital converting the spatial-common-mode-processed signals, obtaining a digital spatial common mode estimate by analog-to-digital converting the spatial common mode estimate, and obtaining at least one digital resulting signal by combining at least one of the digital touch signals with the digital spatial common mode estimate.

In general, in one aspect, one or more embodiments relate to an input device. The input device includes multiple capacitive sensor electrodes, an amplifier configured to generate a feedback signal including a spatial common mode estimate from multiple spatial-common-mode-processed signals, and multiple charge integrators configured to obtain multiple resulting signals from the capacitive sensor electrodes, the resulting signals including a spatial common mode, generate the spatial-common-mode-processed signals by mitigating the spatial common mode in the resulting signals using the feedback signal, a controller. The controller is configured to obtain multiple digital touch signals by analog-to-digital converting the spatial-common-mode-processed signals, obtain a digital spatial common mode estimate by analog-to-digital converting the spatial common mode estimate, and obtain at least one digital resulting signal by combining at least one of the digital touch signals with the digital spatial common mode estimate.

BRIEF DESCRIPTION OF DRAWINGS

The present embodiments are illustrated by way of example and are not intended to be limited by the figures of the accompanying drawings.

DETAILED DESCRIPTION

Figure 1:
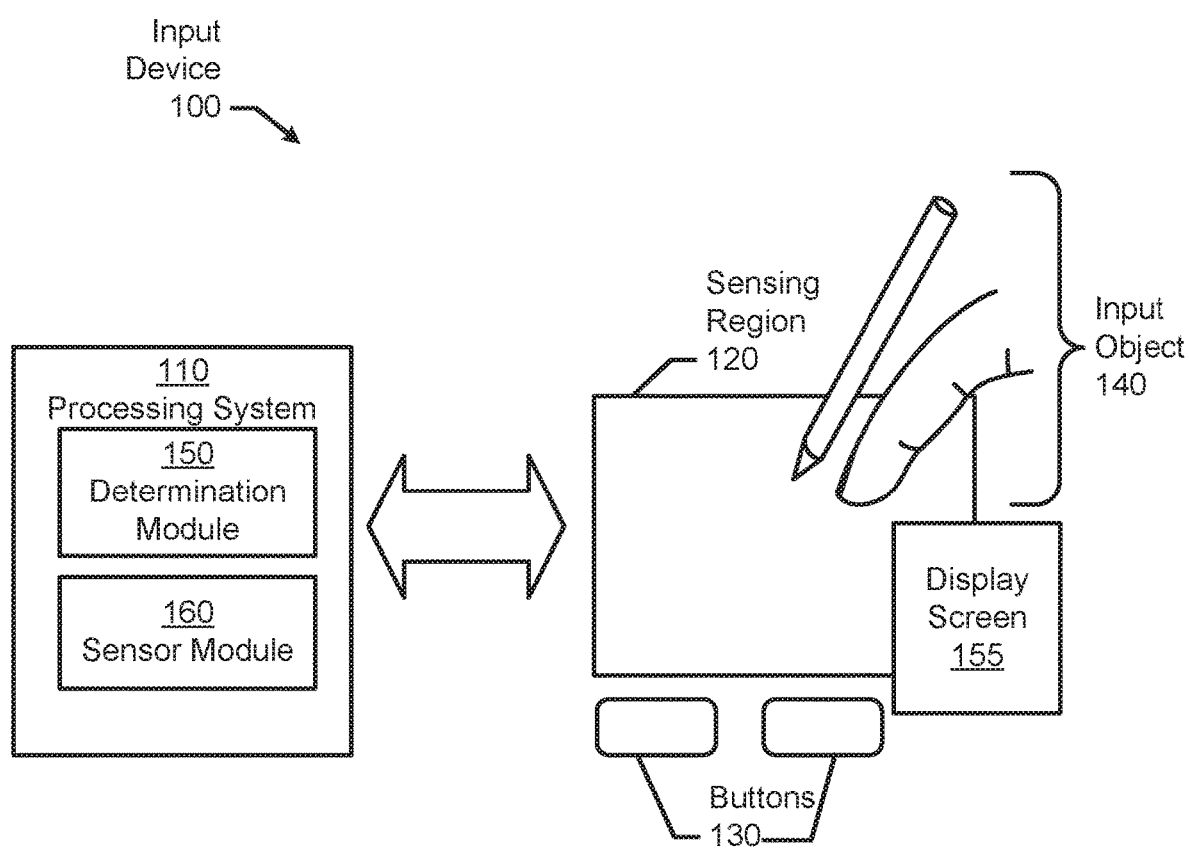
FIG. 1 shows a block diagram of an input device in accordance with one or more embodiments.

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved detectability of input objects. The input device operates by using sensor electrodes that detect changes in signal. A common mode noise suppression circuit is used to mitigate noise to which the sensor electrodes may be exposed. Various aspects of a common mode noise suppression circuit are more fully described in U.S. patent application Ser. No. 16/373,369, the full disclosure of which is incorporated herein by reference.

One source of noise is a display screen. The sensor electrodes may be approximately equally exposed to the noise, regardless of the location of the sensor electrodes. Accordingly, the noise acts like a spatial common mode on the signals obtained from the sensor electrodes. Another spatial common mode may be a background signal as estimated by a baseline. The baseline may be a measurement of the signals obtained from the sensor electrodes when no input object is present in the sensing region. The baseline may be approximately similar across the sensor electrodes, regardless of the location of the sensor electrodes. Additional details regarding noise and baseline affecting the sensing by the sensor electrodes are provided below.

The common mode noise suppression circuit may be used to mitigate spatial common modes such as the described noise and/or baseline. The common mode noise suppression circuit may mitigate a spatial common mode regardless of the nature of the spatial common mode. Accordingly, the common mode noise suppression circuit may mitigate not only undesired spatial common modes, but also spatial common modes that may be of interest. For example, the common mode noise suppression circuit may remove or reduce the spatial common mode signal associated with a large object, when the large object spans all or the majority of sensing electrodes and approximately equally affects the signals of the sensor electrodes. As a result of the mitigation of the spatial common mode by the common mode noise suppression circuit, the presence of the large object may not be detected, unless additional processing is performed.

In one or more embodiments of the disclosure, the spatial common mode is mitigated by analog circuits. One or more embodiments convert an estimate of the spatial common mode from analog domain to digital domain in order for reconstruction of the full sensor signals of the sensor electrodes, despite the mitigation of the spatial common mode by the analog circuits. As a result, embodiments of the disclosure provide various benefits of the mitigation of the spatial common mode in the analog domain, while still allowing the detection of large objects, enabled by an additional processing in the digital domain. The implementation of the mitigation of the spatial common mode in the analog domain and the processing of an estimate of the spatial common mode in the digital domain are subsequently discussed.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) detects inputs involving no physical contact with any surfaces of the input device (100). In other embodiments, the sensing region (120) detects inputs involving contact with an input surface (e.g., a touch screen) of the input device (100) coupled with some amount of applied force or pressure.

The input device (100) may utilize any combination of sensor components and sensing technologies to detect user input in the sensing region (120). The input device (100) includes one or more sensing elements for detecting user input. As several non-limiting examples, the input device (100) may use capacitive, resistive, and/or inductive techniques. The input device (100) may also include one or more physical or virtual buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "transcapacitance"). Absolute capacitance sensing methods detect changes in the capacitive coupling between sensor electrodes and an input object. Trans-capacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement trans-capacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc. For example, the processing system (110) may be part of an integrated touch and display controller.

In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional circuitry may exist in accordance with one or more embodiments of the disclosure.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

In some embodiments, the input device (100) includes a touch screen interface, and the sensing region (120) overlaps at least part of an active area of a display screen (155). The input device (100) may include substantially transparent sensor electrodes overlaying the display screen (155) and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen (155) may be operated in part or in total by the processing system (110).

The sensing region (120) and the display screen (155) may be integrated and follow on-cell or in-cell or hybrid architectures. In other words, display screen (155) may be composed of multiple layers (e.g., one or more polarizer layers, color filter layers, color filter glass layers, thin film transistor (TFT) circuit layers, liquid crystal material layers, TFT glass layers, etc.). The sensor electrodes may be disposed on one or more of the layers. For example, the sensor electrodes may be disposed on the TFT glass layer and/or the color filter glass layer. Moreover, the processing system (110) may be part of an integrated touch and display controller that operates both the display functions and the touch sensing functions.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
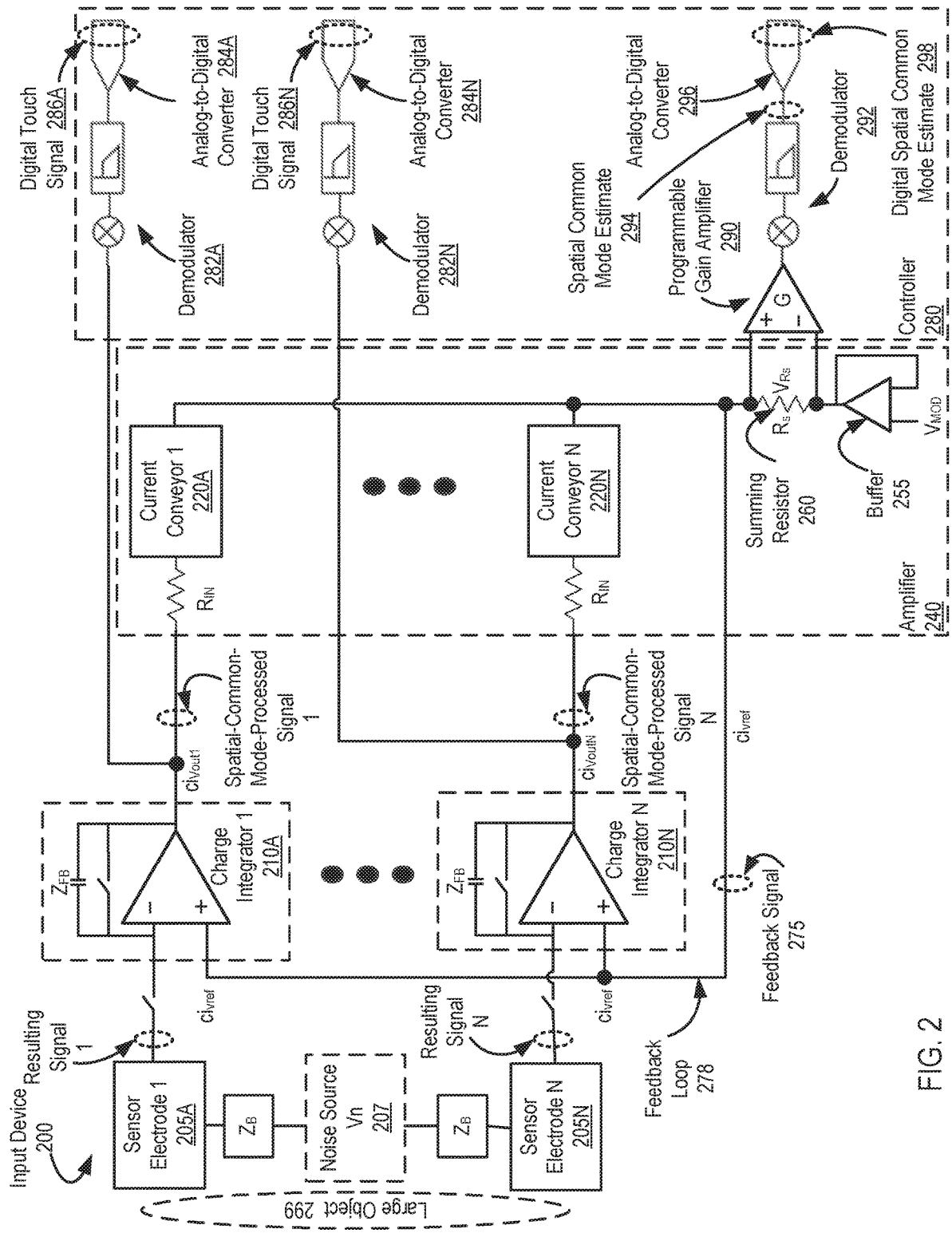
FIG. 2 shows an input device with a common mode noise suppression circuit enabling retrieval of a common mode signal, in accordance with one or more embodiments.

FIG. 2 shows an input device (200) in accordance with one or more embodiments. The input device (200) may correspond to input device (100), discussed above in reference to FIG. 1. Various elements introduced in FIG. 2 may correspond to elements shown in FIG. 1. For example, FIG. 2 introduces sensor electrodes which may be associated with the sensing region (120) of FIG. 1. FIG. 2 also introduces elements configured to drive and to sense the sensor electrodes. These elements may correspond to the sensor module (160) of FIG. 1. FIG. 2 further introduces elements that are associated with evaluating signals obtained from the sensor electrodes. These elements may correspond to the determination module (150). As shown in FIG. 2, the input device (200) includes multiple touch sensor electrodes (e.g., sensor electrode 1 (205A)-sensor electrode N (205N)), multiple charge integrators (charge integrator 1 (210A)-charge integrator N (210N)), an amplifier (240), and a controller (280). The output of the amplifier (240) is coupled to the charge integrators (210A-210N) by a feedback loop (278).

The multiple sensor electrodes (205A-205N) may be used to perform any type of capacitive sensing (e.g., absolute capacitance sensing, trans-capacitance sensing, etc.). The sensor electrodes (205A-205N) may be driven by a modulation voltage $V_{MOD}$, and the output of each sensor electrode (205A-205N) is a resulting signal (e.g., resulting signal 1-resulting signal N) which reflects the presence of an input object, if any, proximate to the capacitive sensor electrode (205A-205N).

In one or more embodiments, input device (200) includes a noise source (207). The noise source (207) may correspond to any common mode noise (Vn). For example, the noise source (207) may generate noise (Vn) during the operation of a display screen (e.g., display screen (155), discussed above in reference to FIG. 1). Accordingly, the noise source (207) may be a display noise source. The noise source (207) may correspond, for example, to a cathode layer of an LED screen and/or a common electrode (VCOM) in an LCD screen. As shown in FIG. 2, the noise source (207) couples to the touch sensor electrodes (205A-205N). In other words, the resulting signal (e.g., resulting signal 1-resulting signal N) from each sensor electrode (205A-205N) may include some component of the noise (Vn) of the noise source (207). In one or more embodiments, the coupling between the display noise source (207) and each sensor electrode (205A-205N) may be modeled as impedance $Z_B$. For example, $Z_B$ may be a resistor ($R_B$) and a capacitor ($C_B$) in series: $Z_B = R_B + 1/(sC_B)$.

In one or more embodiments, the noise (Vn) affects the sensor electrodes 1-N (205A-205N) in a similar manner. Accordingly, the resulting signals 1-N may include a spatial common mode, reflecting the noise (Vn). The common mode is spatial because it may be present on the resulting signals 1-N regardless of the spatial location of the corresponding sensor electrodes (205A-205N). For example, assume that the sensor electrodes (205A-205N) are distributed over the surface of a screen (e.g., an LED or LCD screen). In this example, the spatial common mode is a result of the same or similar Vn coupling into the resulting signals 1-N of the sensing electrodes (205A-205N). Similarly, a spatial common mode may be present when a large object (299) covers the sensing electrodes (205A-205N), because the resulting signals 1-N may be similarly biased due to the presence of the large object in proximity to the sensor electrodes (205A-205N). In one or more embodiments, the large object covers a substantial fraction of the sensor electrodes, or all sensor electrodes. The large object may be, for example, a palm resting on a touch surface, a face in proximity to a sensing region used for facial recognition, etc. In case of the spatial common mode being caused by the noise (Vn), the spatial common mode may include an alternating current (AC) component with a frequency of the noise (Vn). In case of the spatial common mode being caused by a large object, the spatial common mode may include a direct current (DC) component.

As discussed above, the input device (200) includes multiple charge integrators (210A-210N). There may be one charge integrator for each of the sensor electrodes (205A-205N). Moreover, each charge integrator and its corresponding sensor electrode may form, at least in part, a channel. As shown in FIG. 2, each charge integrator (210A-210N) inputs both a resulting signal from the corresponding sensor electrode (205A-205N) and a feedback signal (275) from the output of the amplifier (240). The feedback signal (275) propagates along the feedback loop (278). Further, each charge integrator may be implemented as an operational amplifier in parallel with a switch and a feedback impedance $Z_{FB}$ (e.g., $Z_{FB} = 1/(sC_{FB})$). $C_B$ may be much larger than $C_{FB}$ ($C_B \gg C_{FB}$), and thus $Z_{FB}$ is much larger than $Z_B$ ($Z_{FB} \gg Z_B$). The output of each charge integrator (210A-210N) is a spatial-common-mode-processed signal (e.g., spatial-common-mode-processed signal 1-spatial-common-mode-processed signal N). As shown in FIG. 2, the spatial-common-mode-processed signals are inputs to both the controller (280) and the amplifier (240). In one or more embodiments, in the spatial-common-mode-processed signals 1-N, the spatial common mode is mitigated, i.e., reduced, partially eliminated, almost entirely or entirely eliminated, in comparison to the corresponding resulting signals 1-N. A discussion of the mitigation of the common mode, performed by the input device (200), is provided below.

As discussed above, the input device (200) includes an amplifier (240). The amplifier (240) may amplify (e.g., scale) each spatial-common-mode-processed signal (i.e., spatial-common-mode-processed signal 1-spatial-common-mode-processed signal N) by a factor of $-A/N$, where N is the number (i.e., cardinality) of spatial-common-mode-processed signals (i.e., number of channels), and where A is a gain value. As shown in FIG. 2, the amplifier (240) may be implemented with multiple input resistors ($R_{IN}$) and multiple current conveyors (current conveyor 1 (220A)-current conveyor N (220N)). Specifically, there may be one input resistor ($R_{IN}$) and one current conveyor (220A-220N) per spatial-common-mode-processed signal (i.e., per channel). The amplifier (240) may also include a buffer (255) storing value $V_{MOD}$, and a summing resistor (260) with a resistance of $A \times R_{IN} \times (1/N)$. The mitigation of the spatial common mode by the various circuit elements is described below.

In one or more embodiments, the input device (200) includes the controller (280). The controller (280) is configured to determine, based on the output of one or more charge integrators (210A-210N), the position of an input object(s), if any, in a sensing region defined by the sensor electrode (205A-205N) (e.g., sensing region (120), discussed above in reference to FIG. 1). The controller (280) may be implemented in hardware (i.e., circuits), software, or any combination thereof. The controller (280) may correspond to either a touch controller that operates the touch sensing functions or an integrated touch and display controller that operates both the display functions and the touch sensing functions.

In FIG. 2, some element of the controller (280) are shown. More specifically, the controller (280) includes a demodulator (282A) and an analog-to-digital converter (284A) outputting a digital touch signal (286A) for sensor electrode 1 (205A). The digital touch signal (286A) is obtained based on the spatial-common-mode-processed signal 1, and therefore does not include the common mode of the resulting signal 1, or only a fraction of the common mode, depending on the effectiveness of the mitigation of the spatial common mode. The controller (280) further includes a demodulator (282N) and an analog-to-digital converter (284N) outputting a digital touch signal (286N) for sensor electrode N (205N). The digital touch signal (286N) is obtained based on the spatial-common-mode-processed signal N, and therefore does not include the common mode of the resulting signal N, or only a fraction of the common mode, depending on the effectiveness of the mitigation of the spatial common mode.

The controller (280) may include one demodulator and one analog-to-digital converter for each of the sensor electrodes of the input device (200). The controller (280) also includes a programmable gain amplifier (PGA) (290), a demodulator (292), and an analog-to-digital converter (296) outputting a digital spatial common mode estimate (298). The digital spatial common mode estimate (298) is obtained by analog-to-digital converting the spatial common mode estimate (294). The spatial common mode estimate (294) is obtained from the voltage VRs over the summing resistor (260), measured by the PGA (290), and processed by the demodulator (292). The demodulators (282A-282N, 292) may include a mixer and a low pass filter. The mixer may perform a multiplication operation, e.g., using $V_{MOD}$, prior to a low-pass filtering operation by the low-pass filter. The operation of the controller (280) is described below with reference to the flowchart of FIG. 4.

The digital touch signals (286A-286N) and/or the digital spatial common mode estimate (298) may subsequently be digitally processed by a computer processor. Processing steps may include the detection of objects of various sizes, e.g., small objects, large objects, etc. In one or more embodiments, the detection of large objects involves the process of the digital touch signals (286A-286N) and the digital spatial common mode estimate (298) in combination, as discussed below with reference to the flowchart of FIG. 4.

In one or more embodiments, the amplifier (240) and the feedback loop (278), when coupled to the charge integrators (210A-210N), form a common mode noise suppression circuit The common mode noise suppression circuit includes the spatial common mode estimate (294) in the feedback signal (275), enabling the subtraction of the spatial common mode estimate (294) from the resulting signals 1-N to mitigate the spatial common mode on the resulting signals 1-N. Consider, for example, noise emitted by the noise source, Vn (207), and picked up by the sensor electrodes (205A-205N). Without the common mode noise suppression circuit, the noise gain ($ci_{VOUT}/Vn$) is: $ci_{VOUT}/Vn = Z_{FB}/Z_B$. Since $Z_{FB} \gg Z_B$, the noise gain is larger than one. Accordingly, without the common mode noise suppression circuit, the controller (280) processes a potentially very noisy signal, which could lead to incorrect output results (e.g., detecting an input object when no input object is present, determining the wrong location of an input object, etc.). However, when the common mode noise suppression circuit is present, the noise gain ($ci_{VOUT}/Vn$) may be determined as: $ci_{VOUT}/Vn = -(Z_{FB}/Z_B) \times 1/(A+1+AZ_{FB}/Z_B)$. In many embodiments, A is much larger than 1 (i.e., $A \gg 1$), and the noise gain may be approximated as: $ci_{VOUT}/Vn = (-1/A) \times (Z_{FB}/Z_B) \times 1/(1+Z_{FB}/Z_B)$. Substituting $Z_B = R_B + 1/(sC_B)$ and $Z_{FB} = 1/(sC_{FB})$, $ci_{VOUT}/Vn = (-1/A) \times C_B \times 1/(C_B + C_{FB}) \times 1/(1+sR_BCF_B \| C_B))$.

In other words, with the common mode noise suppression circuit, the noise (Vn) may be mitigated by $1/A \times 1/(1+Z_{FB}/Z_B)$ before processing by the controller (280). Since $Z_{FB} \gg Z_B$, the attenuation may be approximated as $1/A \times Z_B/Z_{FB}$. Other common mode noise including the common mode component of global coarse baseline cancellation (GCBC), and/or a spatial common mode introduced by the presence of the large object (299) may also be attenuated by the common mode noise suppression circuit. As the touch sensor processor (280) is processing a less noisy signal, it is less likely that the output results of the touch sensor processor will be incorrect.

In one or more embodiments, with the common mode noise suppression circuit, the signal transfer function for the channel proximate to an input object ($ci_{VOUT1}$) may be approximated as: $ci_{VOUT1} = dC_B(1-1/N)V_{MOD}$, where $dC_B$ is the change in capacitance between the display noise source (207) and the sensor electrode due to the input object, and $V_{MOD}$ is the modulation voltage in the buffer (255). The signal transfer functions for the remaining channels $ci_{VOUTX, X \neq 1}$ (i.e., the channels not proximate to the input object) may be approximated as: $ci_{VOUTX, X \neq 1} = (-1/N) \times dC_B \times V_{MOD}$. In other words, the touched sensor pixel (i.e., tixel) shows almost full response and untouched tixels show a small response in the oppose direction.

The above description is in the context of absolute capacitance (or self-capacitance) sensing. The described circuit also applies to trans-capacitance (or mutual capacitance) sensing. In trans-capacitance sensing, $V_{MOD}$ is typically held at a constant voltage (e.g. VDD/2), a transmitter with voltage swing Vtx drives trans-capacitance, and proximity is detected by measuring a change in $C_t$, or $dC_t$. The suppression of noise Vn follows the same equation: $ci_{VOUT}/Vn = (-1/A) \times C_B \times 1/(C_B + C_{FB}) \times 1/(1+sR_BCF_B \| C_B))$. The signal transfer function for a touch tixel is $ci_{VOUT1} = -dC_t(1-1/N)V_{tx}$, and $ci_{VOUTX, X \neq 1} = 1/N \times dC_t \times V_{tx}$ for untouched tixels.

Figure 3A:
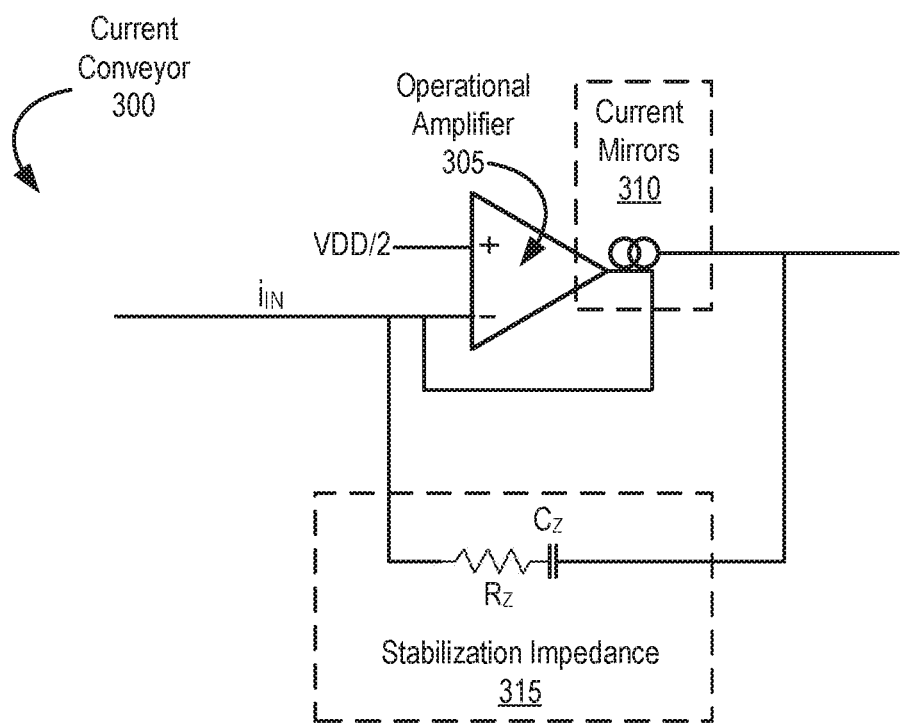
FIG. 3A shows a current conveyor in accordance with one or more embodiments.

FIG. 3A shows a current conveyor (300) in accordance with one or more embodiments. The current conveyor (300) may correspond to any of the current conveyors (220A-220N) discussed above in reference to FIG. 2. As shown in FIG. 3A, the current conveyor (300) may include an operational amplifier (305) and one or more current mirrors (310) coupled to an output of the operational amplifier (305). Those skilled in the art, having the benefit of this detailed description, will appreciate that the input current to the current conveyor (300) and the output current from the current conveyor (300) may be identical or substantially identical in magnitude, but opposite in direction.

In one or more embodiments, the common mode noise suppression circuit includes 4 poles: the dominant pole in the operational amplifier of a charge integrator, the pole at $ci_{VOUT}$, the pole at $i_{IN}$ of the current conveyor (300), and the pole at $ci_{VREF}$ (shown in FIG. 2). In one or more embodiments, in order to stabilize the loop, a stabilization impedance (315) including resistor $R_Z$ and a capacitor $C_Z$ is added as shown in FIG. 3A. This creates a pole and a zero in the current conveyor. The pole is typically dominant with A>>1, which narrow bands the loop. The zero gives a phase boost to get enough phase margin. Those skilled in the art, having the benefit of this detailed description, will appreciate that there are other ways to stabilize the loop without using $R_Z$ and $C_Z$. For example, stabilizing the loop may be achieved by increasing the compensation capacitor in the charge integrator, which effectively moves the dominant pole to a lower frequency.

Figure 3B:
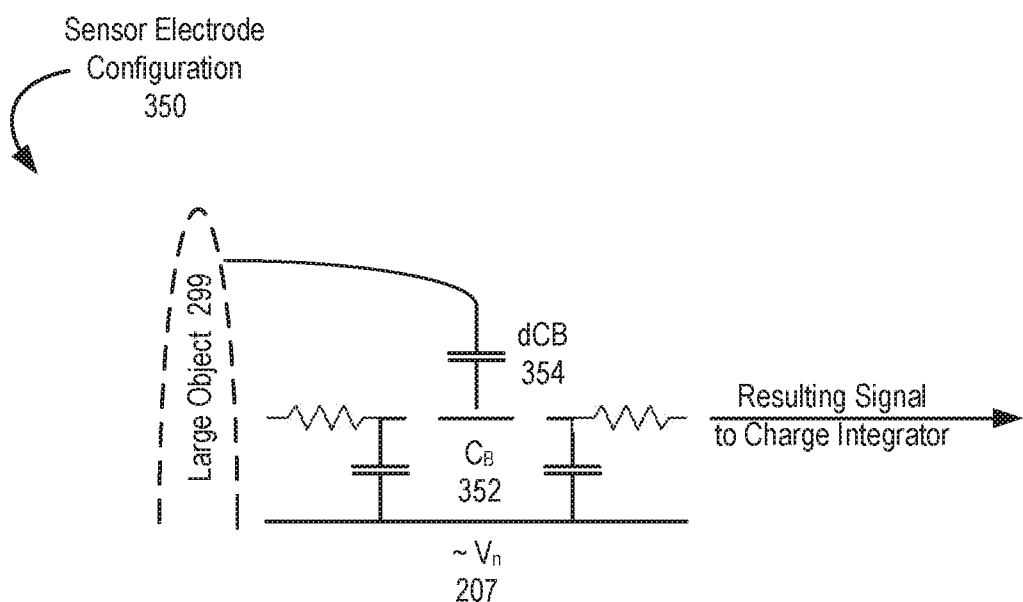
FIG. 3B shows a sensor electrode configuration in accordance with one or more embodiments.

FIG. 3B shows a sensor electrode configuration in accordance with one or more embodiments. The sensor electrode configuration (350) is for an absolute capacitance sensing and is intended to illustrate how a sensing by a sensor electrode may be affected by the presence of an object and/or noise. The sensor electrode configuration uses resistive and capacitive elements to model the absolute capacitance sensing. In particular, $dC_B$ (354), a capacitance to an object (e.g., the large object (299)) may contribute to the sensing signal. $dC_B$ (354), in one or more embodiments, is the capacitance that ultimately enables the input device to determine whether an object is present in the sensing region, or not. Further, $C_B$ (352), a background capacitance to a structural component, e.g., a cathode layer of an LED screen and/or a common electrode (VCOM) in an LCD screen) may contribute to the sensing signal. The contribution may include an AC component such as Vn (207), e.g., noise (Vn) emitted by the LED or LCD screen.

Figure 4:
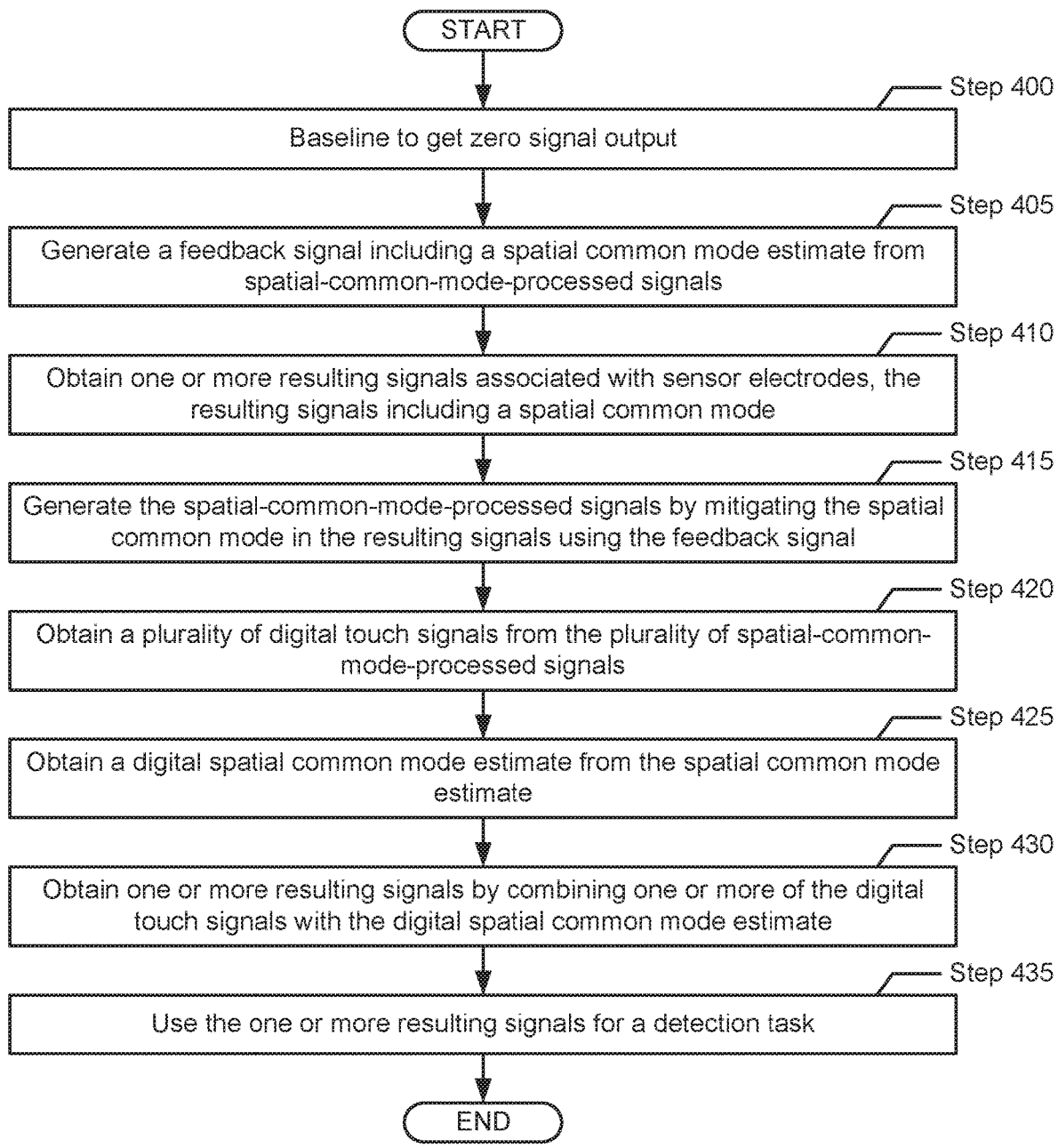
FIG. 4 shows a flowchart in accordance with one or more embodiments.

FIG. 4 shows a flowchart in accordance with one or more embodiments. The flowchart of FIG. 4 depicts a method for operating an input device (e.g., input device (200)). One or more of the steps in FIG. 4 may be performed by the components of the input device (200), discussed above in reference to FIG. 2 and/or the input device (100), discussed above with reference to FIG. 1. In one or more embodiments, one or more of the steps shown in FIG. 4 may be omitted, repeated, and/or performed in a different order than the order shown in FIG. 4. Accordingly, the scope of the disclosure should not be considered limited to the specific arrangement of steps shown in FIG. 4.

In one or more embodiments, the subsequently described method is for a common mode noise suppression allowing a restoration of a common mode signal. The common mode noise suppression is based on analog circuit elements that form a common mode noise suppression circuit, e.g., as shown in FIG. 2. As previously described, the common mode noise suppression circuit may mitigate a spatial common mode regardless of the nature of the spatial common mode. For example, the common mode noise suppression circuit may remove noise, but also the signal associated with a large object.

Removing the spatial common mode by analog circuits may have benefits. For example, the subtraction of the spatial common mode estimate from the resulting signals may prevent a saturation of the charge integrators, thereby avoiding signal clipping. The mitigation of the spatial common mode may thus enable the use of smaller feedback capacitors at the charge integrators while still avoiding saturation. Further, since a capacitive baseline of the sensor electrodes may be similar across the sensor electrodes, the capacitive baseline may be effectively eliminated or reduced by the mitigation of the spatial common mode, without requiring a dedicated baseline correction.

Despite these advantages, it may be desirable to obtain the entire signals (the resulting signals, in FIG. 2) associated with the sensor electrodes, including the spatial common mode, or at least a component of the spatial common mode. In one or more embodiments, the subsequently described method enables a digital restoration of the spatial common mode after an analog-to-digital conversion. The restored spatial common mode may subsequently be used for various purposes. For example, the restored spatial common mode may be used to detect large objects, as described below. Further, the restored spatial common mode may be used to determine a capacitive baseline of the sensor electrodes.

Briefly summarized, the following method may thus provide a spatial common mode mitigation by analog circuits, followed by a restoration of the spatial common mode by digital processing.

Initially, in Step 400, baselining is performed to get a zero signal output at $ci_{VOUT}$. In other words, $ci_{VOUT}$ is measured without touch and without amplifier feedback (i.e., A=0), but with $V_{MOD}$ active. Under such conditions, the measured $ci_{VOUT}$ reflects the fixed capacitance in the sensor. A coarse baseline cancellation (CBC) circuit (not shown) may or may not be used to remove the fixed capacitance in the sensor so net changes in capacitance can be more easily detected. In one or more embodiments, following execution of Step 400, the input device is ready for interaction (e.g., touch sensing) with a user. Execution of Step 400 is optional.

In Step 405, a feedback signal is generated. The feedback signal is generated by amplifying spatial-common-mode-processed signals based on a gain value and a cardinality of the spatial-common-mode-processed signals (i.e., the number of spatial-common-mode-processed signals). The gain between the output of each charge integrator and the output of the loop (i.e., $ci_{VREF}$) is $(-g_m R_s) \times 1/(1+g_m R_{IN})$, where $R_s$ is the resistance of the summing resistor (260). For $g_m R_{IN} >> 1$, this gain may be approximated as $-R_s/R_{IN}$. For N channels with a common mode noise signal, the gain becomes $-N \times R_s/R_{IN}$. By setting $R_s = A \times R_{IN} \times (1/N)$, the gain becomes $-A$ for N channels or $-A/N$ for each channel, where N is the cardinality of the spatial-common-mode-processed signals (i.e., the cardinality of the channels). Accordingly, the feedback signal may be understood as including a spatial common mode estimate. Based on the described circuitry, the spatial common mode estimate is or approximates an average over the resulting signals 1-N. The amplifier may be implemented with multiple current conveyors and a single summing resistor. The feedback signal is the output of the amplifier.

In Step 410, one or more resulting signals are obtained. The resulting signals are associated with sensor electrodes involved in any type of capacitive sensing. There may be coupling between the sensor electrodes and a noise source (e.g., a display noise source). Accordingly, the resulting signals may include a component associated with the noise source, and the resulting signals may further reflect the presence of an input object, if any, proximate the sensor electrodes. In one or more embodiments, the resulting signals include a spatial common mode. The spatial common mode may be associated with, for example, noise and/or a large object.

In Step 415, the spatial-common-mode-processed signals are generated by mitigating the spatial common mode in the resulting signals using the feedback signal. The spatial common mode may be mitigated regardless of the nature of the spatial common mode. For example, a spatial common mode resulting from noise may be mitigated, and/or a spatial common mode resulting from a large object may be mitigated. The mitigation may involve the resulting signals and the feedback signal as inputs to the charge integrators. Each charge integrator may integrate a difference between one of the resulting signals and the feedback signal. Because the feedback signal, in one or more embodiments, includes the spatial common mode estimate, the spatial common mode is mitigated. The output of a charge integrator is a spatial-common-mode-processed signal. The feedback loop, the amplifier, and the charge integrators effectively act as a common mode noise suppression circuit.

Steps 400-415 are performed in the analog domain. Accordingly, while Steps 400-415 have been separately described, Steps 400-415 may be simultaneously performed by an analog circuit such as the analog circuit described with reference to FIG. 2.

In Step 420, digital touch signals are obtained from the spatial-common-mode-processed signals. A demodulation followed by an analog-to-digital conversion may be performed to obtain the digital touch signals. The demodulation may be performed using a multiplication operation, e.g., using $V_{MOD}$, followed by a low-pass filtering operation, thereby removing the modulation voltage $V_{MOD}$. Those skilled in the art will appreciate that different demodulation methods may be used, without departing from the disclosure. Step 420 may be performed for one or more digital touch signals, for example, for all sensor electrodes.

In Step 425, a digital spatial common mode estimate is obtained from the spatial common mode estimate. A demodulation followed by an analog-to-digital conversion may be performed to obtain the digital spatial common mode estimates. The demodulation may be performed using a multiplication operation, e.g., using $V_{MOD}$, followed by a low-pass filtering operation thereby removing the modulation voltage $V_{MOD}$. Those skilled in the art will appreciate that different demodulation methods may be used, without departing from the disclosure.

In Step 430, one or more digital resulting signals may be obtained by combining one or more of the digital touch signals with the digital spatial common mode estimate. For example, a digital touch signal may be additively combined with the digital spatial common mode estimate. A digital resulting signal may, thus, approximate the resulting signal initially obtained from the corresponding sensor electrode. For example, if the resulting signal is affected by a spatial common mode, the digital resulting signal may also include the spatial common mode, or a component of the spatial common mode.

In one or more embodiments, the digital spatial common mode and/or the digital resulting signals are further processed, e.g., by filtering. Specifically, low-pass filtering may be applied to eliminate or attenuate high-frequency components while passing low-frequency and/or DC components. The filtering may be performed in the analog domain, e.g., by the low-pass filters of the demodulators, by an additional analog filter, and/or by a filter in the digital domain. The digital resulting signal, thus, may include a component of the spatial common mode carrying information about the presence of a large object, but may not include a component of the spatial common mode associated with noise.

Consider, for example, the scenario illustrated in FIG. 2. In the example, the spatial common mode includes a component associated with the presence of a large object, and further includes a component associated with noise. In the example, after the low-pass filtering, the digital resulting signal may include the component associated with the presence of the large object (substantially a DC signal that passes the low-pass filter), but not the component associated with the noise (substantially a high-frequency AC signal that is attenuated by the low-pass filter). Step 430 may be performed for a single digital touch signal, for multiple digital touch signals, or for all digital touch signals associated with the sensor electrodes of the input device.

In Step 435, the one or more digital resulting signals are used to perform a detection task. The detection task may be, for example, an object detection and/or a baseline detection task.

The detection of a large object may be performed based on an evaluation of the digital resulting signals across the sensor electrodes of the input device. In comparison to an evaluation of the digital resulting signal at an earlier point in time (in absence of the large object), the digital resulting signals differ, indicating the presence of the large object. While the digital touch signals alone (without the digital spatial common mode estimate) may not provide any indication of the presence of the large object, as a result of the common mode mitigation, the explicit consideration of the digital spatial common mode estimate in the digital resulting signals enables the detection of the large object. The detection may not be adversely affected by noise, because low-pass filtering may have attenuated the noise. Accordingly, an erroneous detection (e.g., the detection of an object when no object is present, the detection of an object in the wrong position, etc.) is less likely.

The following sensing scenarios briefly illustrate the operations in the analog and digital domains resulting in certain outcomes in presence of small objects and large objects. Those skilled in the art will appreciate that the sensing scenarios are merely intended to serve as examples. The disclosure is not limited to these use cases.

(1) In absence of a large object, the digital spatial common mode estimate corresponds to a sampled and filtered G×Vn, with G being the gain of the programmable gain amplifier. This corresponds to the spatial common mode associated with the noise injected by the noise source, in FIG. 2. The digital spatial common mode estimate may be applied to any of the digital touch signals to restore a full signal, as sensed by the corresponding sensor electrode(s). In other words, a digital resulting signal reflecting the resulting signal of the corresponding sensor electrode may be obtained for any sensor electrode, in absence of the large object. Depending on, for example, how low-pass filtering is performed, this digital resulting signal may or may not include the noise Vn. The sensing scenario may apply to a complete absence of objects in the sensing region, and to a presence of one or more small objects, e.g. input objects, in the sensing region. An input object may be detected based on one or more of the digital touch signals, without necessarily requiring consideration of the digital spatial common mode. For example, an input object may be detected based on a change of one or more of the digital touch signals, and/or based on a difference of a digital touch signal of a sensor electrode to another digital touch signal of an adjacently located sensor electrode.

(2) In presence of a large object, the digital spatial common mode estimate corresponds to: $G \times (Vn+dC_B/C_B \times V_{MOD}) \times G_{demod\_filt}$, with G being the gain of the programmable gain amplifier, and $G_{demod\_filt}$ being the gain of the demodulator and filter. The filter gain is frequency-dependent: With the demodulation being performed synchronously to $V_{MOD}$, and the filter operating at the frequency of $V_{MOD}$, $G_{demod\_filt}=1$ for the signal $G \times dC_B/C_B \times V_{MOD}$, while $G \times Vn$ is attenuated by the filter. As a result, the digital spatial common mode estimate does not depend on the display noise, while still enabling the evaluation of a common mode capacitance associated with the large object, e.g., a face near an input surface. Such information may be used, for example, to turn off the display, when a face is detected in proximity to the display.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope.

What is claimed is:

1. A processing system comprising:
    an amplifier configured to generate a feedback signal comprising a spatial common mode estimate from a plurality of spatial-common-mode-processed signals;
    a plurality of charge integrators configured to:
        obtain a plurality of resulting signals from a plurality of capacitive sensor electrodes, the plurality of resulting signals comprising a spatial common mode; and
        generate the plurality of spatial-common-mode-processed signals by mitigating the spatial common mode in the plurality of resulting signals using the feedback signal; and
    a controller comprising:
        a programmable gain amplifier capturing the spatial common mode estimate over a summing resistor of the amplifier;
        a demodulator configured to remove a modulation voltage from the spatial common mode estimate; and
        an analog-to-digital converter configured to perform an analog-to-digital conversion to obtain a digital spatial common mode estimate from the spatial common mode estimate;
    the controller further configured to:
        obtain a plurality of digital touch signals by analog-to-digital conversion of the plurality of spatial-common-mode-processed signals;
        obtain at least one digital resulting signal by combining at least one of the plurality of digital touch signals with the digital spatial common mode estimate.

2. The processing system of claim 1, wherein the demodulator comprises a low-pass filter configured to attenuate a high-frequency component of the spatial common mode estimate.

3. The processing system of claim 2, wherein the low-pass filter is configured to attenuate noise associated with a display.

4. The processing system of claim 1, wherein the controller is further configured to determine that a large object is proximate to the plurality of capacitive sensor electrodes based on the plurality of digital resulting signals differing from the plurality of digital resulting signals obtained in absence of the large object.

5. The processing system of claim 4, wherein the spatial common mode comprises a component associated with the large object proximate to the plurality of capacitive sensor electrodes.

6. The processing system of claim 1, wherein the controller is further configured to determine that an input object is proximate to at least one of the plurality of capacitive sensor electrodes based on at least one of the plurality of digital touch signals.

7. The processing system of claim 1, wherein the spatial common mode comprises a component associated with a baseline of the plurality of capacitive sensor electrodes.

8. The processing system of claim 1, wherein the amplifier comprises:
    a plurality of input resistors coupled to the plurality of charge integrators;
    a plurality of current conveyors coupled to the plurality of input resistors; and
    the summing resistor coupled to the plurality of current conveyors.

9. The processing system of claim 8, wherein:
    each of the plurality of input resistors comprises a resistance of R;
    the gain value is A;
    the cardinality of the plurality of spatial-common-mode-processed signals is N;
    the summing resistor comprises a resistance of $A \times R \times (1/N)$; and
    the amplifier amplifies each of the plurality of spatial-common-mode-processed signals by $-A/N$.

10. The processing system of claim 8, wherein each of the plurality of current conveyors comprises:
    an operational amplifier;
    a plurality of current mirrors coupled to an output of the operational amplifier; and
    a stabilization impedance coupled to an input of the operational amplifier.

11. The processing system of claim 1, wherein:
    each of the plurality of charge integrators comprises an operational amplifier in parallel with an impedance; and
    the feedback signal is coupled to a non-inverting input of each of the plurality of charge integrators.

12. A method comprising:
    generating, by an amplifier, a feedback signal comprising a spatial common mode estimate from a plurality of spatial-common-mode-processed signals;
    obtaining a plurality of resulting signals from a plurality of capacitive sensor electrodes, the plurality of resulting signals comprising a spatial common mode;
    generating the plurality of spatial-common-mode-processed signals by mitigating the spatial common mode in the plurality of resulting signals using the feedback signal;

obtaining a plurality of digital touch signals by analog-to-digital conversion of the plurality of spatial-common-mode-processed signals;
capturing, by a programmable gain amplifier, the spatial common mode estimate over a summing resistor of the amplifier;
removing, by a demodulator, a modulation voltage from the spatial common mode estimate;
performing an analog-to-digital conversion of the spatial common mode estimate to obtain a digital spatial common mode estimate;
obtaining at least one digital resulting signal by combining at least one of the plurality of digital touch signals with the digital spatial common mode estimate.

13. The method of claim 12, further comprising:
attenuating a high-frequency component of the spatial common mode estimate by a low-pass filter of the demodulator.

14. The method of claim 13, wherein the attenuated high-frequency component is noise associated with a display.

15. The method of claim 12, further comprising:
determining that a large object is proximate to the plurality of capacitive sensor electrodes based on the plurality of digital resulting signals differing from the plurality of digital resulting signals obtained in absence of the large object.

16. The method of claim 15, wherein the spatial common mode comprises a component associated with the large object proximate to the plurality of capacitive sensor electrodes.

17. An input device comprising:
a plurality of capacitive sensor electrodes;
an amplifier configured to generate a feedback signal comprising a spatial common mode estimate from a plurality of spatial-common-mode-processed signals; and
a plurality of charge integrators configured to:
obtain a plurality of resulting signals from the plurality of capacitive sensor electrodes, the plurality of resulting signals comprising a spatial common mode; and
generate the plurality of spatial-common-mode-processed signals by mitigating the spatial common mode in the plurality of resulting signals using the feedback signal; and
a controller comprising:
a programmable gain amplifier capturing the spatial common mode estimate over a summing resistor of the amplifier;
a demodulator configured to remove a modulation voltage from the spatial common mode estimate; and
an analog-to-digital converter configured to perform an analog-to-digital conversion to obtain a digital spatial common mode estimate from the spatial common mode estimate;
the controller further configured to:
obtain a plurality of digital touch signals by analog-to-digital conversion of the plurality of spatial-common-mode-processed signals;
obtain at least one digital resulting signal by combining at least one of the plurality of digital touch signals with the digital spatial common mode estimate.

* * * * *